(12) United States Patent
Bensinger et al.

(10) Patent No.: US 7,128,436 B2
(45) Date of Patent: Oct. 31, 2006

(54) FLASHLIGHT LENS COVER

(75) Inventors: Ronald Bensinger, Herndon, PA (US); Brian E. Probst, Renovo, PA (US)

(73) Assignee: W. T. Storey, Inc., Dalmentia, PA (US)

( * ) Notice: Subject to any disclaimer, the term of this patent is extended or adjusted under 35 U.S.C. 154(b) by 149 days.

(21) Appl. No.: 11/045,680

(22) Filed: Jan. 28, 2005

(65) Prior Publication Data

US 2006/0171146 A1    Aug. 3, 2006

(51) Int. Cl.
*F21L 4/00* (2006.01)
*F21V 17/02* (2006.01)

(52) U.S. Cl. ............... 362/186; 362/208; 362/202; 362/449

(58) Field of Classification Search ........... 362/208, 362/186, 187, 202, 200, 277, 282, 319, 320, 362/287, 197, 198, 199, 433, 449, 455; 359/811, 359/818, 819, 822, 828
See application file for complete search history.

(56) References Cited

U.S. PATENT DOCUMENTS

| 2,420,307 | A | * | 5/1947 | Fristoe ................. 362/186 |
| 2,889,629 | A | | 6/1959 | Darkenwald |
| 3,831,285 | A | | 8/1974 | Vissing |
| 3,942,864 | A | | 3/1976 | Numbers |
| 4,909,617 | A | * | 3/1990 | Boyd ................... 359/611 |
| 6,761,467 | B1 | | 7/2004 | Matthews et al. |
| 6,811,268 | B1 | * | 11/2004 | Watson ................. 359/611 |
| 2005/0168976 | A1 | * | 8/2005 | Chen .................... 362/186 |

* cited by examiner

*Primary Examiner*—Sandra O'Shea
*Assistant Examiner*—Bao Q. Truong
(74) *Attorney, Agent, or Firm*—Thomas R. Shaffer

(57) ABSTRACT

A flashlight lens cover has a generally cylindrical body member and a generally circular cap member which is pivotally connected to the body member. A spring member urges the cap member to an open position. When inward force is imparted to opposite sides of the body member, said sides move relatively closer together causing a first end and second end to move relatively further apart causing a retaining ledge of a latch member to be moved away from engagement with an edge portion of the cap causing the cap member to move to an open position until manually closed.

15 Claims, 4 Drawing Sheets

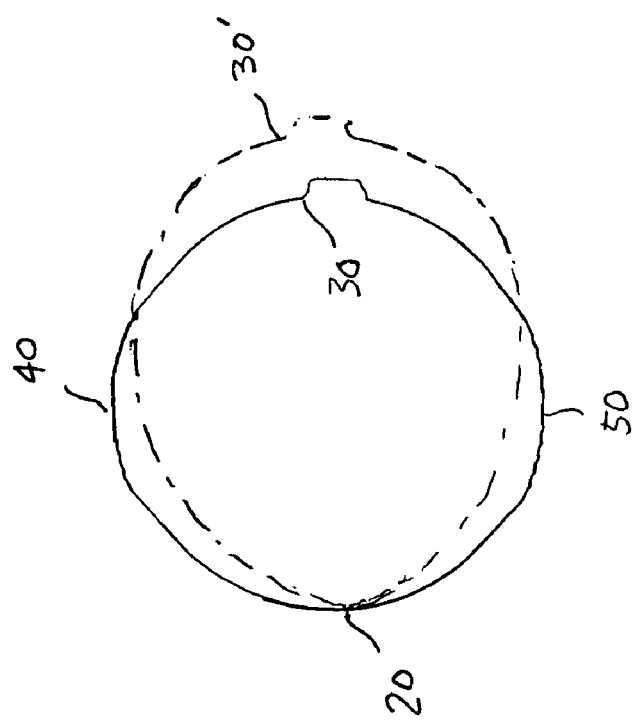
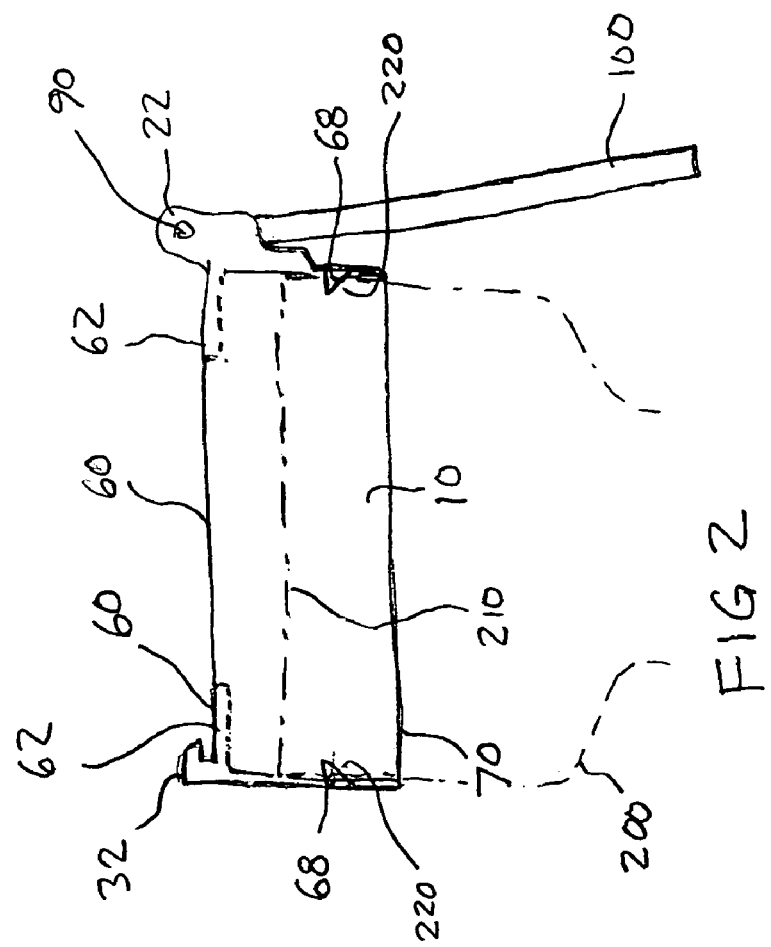

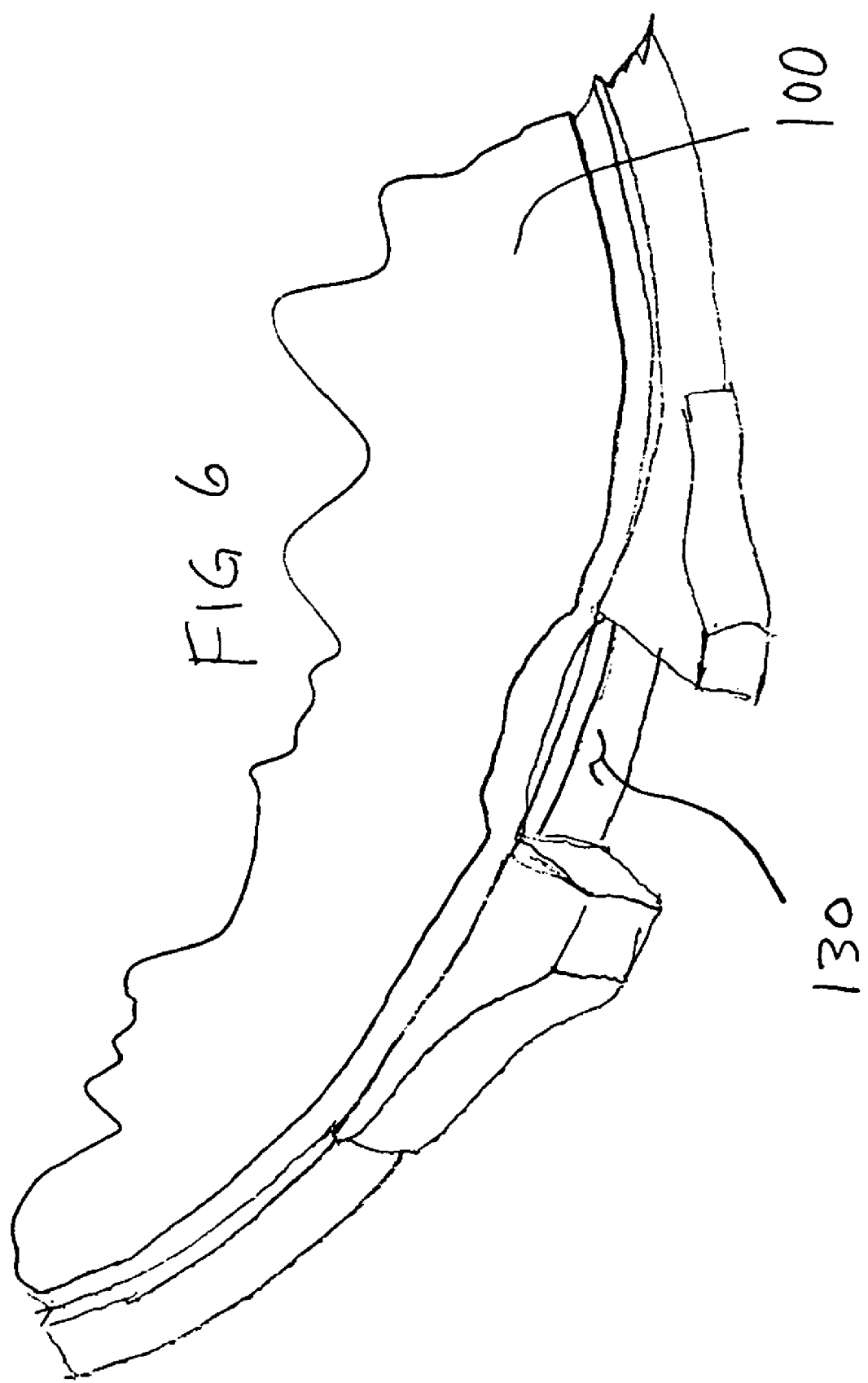

FLASHLIGHT LENS COVER

BACKGROUND OF THE INVENTION

1. Field of the Invention

The present invention relates to a flashlight lens cover. More specifically, it relates to a flashlight lens cover which has a cap member pivotally mounted to a body member which is spring loaded to an open position when a latch is released.

2. Description of the Prior Art

The use of pivotally mounted lens covers on rifle scopes and binoculars is well known in the art. One example of a spring loaded lens cover for a rifle scope is shown in Vissing, U.S. Pat. No. 3,831,285. The Vissing lens cap is opened by the manipulation of a finger projection 17 as shown in FIG. 1.

Another example of an eye piece cover for gun scopes and binoculars is shown in Darkenwald, U.S. Pat. No. 2,889,629. The Darkenwald device is also provides a spring loaded cover which is opened by the depression of a spring clip 48 which is riveted to tubular body member 16. Each of these devices require the user to specifically locate and manipulate a particular latch release mechanism.

Numbers, U.S. Pat. No. 3,942,864 discloses a threadedly mounted cap for the lens opening of optical equipment such as cameras. Numbers provides a complex over center spring 22 which can be arranged to bias the lens cap in either an opened or closed direction.

The provision of light beam modifiers for flashlights and the like is also known. For example, Matthews, et al., U.S. Pat. No. 6,761,467 discloses a light beam modifier which has a body portion which is clamped onto the flashlight head and which has a spring loaded flip up cover 40. As is the case with many flip up lens covers, opening the cover requires manipulation of a finger-actuable portion 114 of the hook member 110 as is shown in FIG. 4 of the Matthews.

There remains a need for a flashlight lens cover (which term is intended to include covers for rifle lens, binoculars or other optical devices) which allows a user to quickly and easily open the flip up cover when use of the device is desired. There also remains a need for a lens cover device which is useful and inexpensive to manufacture and use.

SUMMARY OF THE INVENTION

In its simplest form, the present invention provides a flashlight lens cover which includes a generally cylindrical body member. The body member has an outer wall surface and an inner wall surface. It has a first end, a second end, a first side and a second side. The body also has a top surface and a bottom surface. The body member has a pivotal connection means at the first end and a latch member at the second end. The latch member extends upwardly above the top surface. The latch member has a retaining ledge portion which extends inwardly to a position located inside the outer wall surface. The latch member has an inclined surface portion which slopes inwardly towards the inner wall and downwardly towards the top surface.

A generally cylindrical cap member is provided which has a cap pivotal connection means pivotally connected to said body pivotally connection means. This allows the cap member to pivot between a closed position and an open position. The cap member is adapted to rest upon the body member top surface when it is in the closed position. The cap member has a cylindrical edge portion which, when closed, pushes the inclined upper surface portion of the latch member temporarily outwardly and causes the edge portion to be held in a closed position by the retaining ledge.

A spring member is positioned between the body member and the cap member to urge the cap member to the open position. When inward force is imparted to the first side and the second side such as to move the first side and the second side of the body member relatively closer together, the first end and the second end are caused to move relatively further apart thereby causing the retaining ledge of the latch means to be moved away from engagement with the cap edge portion and causing the cap member to move to and stay in an open position until manually closed.

Preferably, the flashlight lens cover has a cap which is translucent. Preferably, the cap has a roughened surface to at least partially diffuse light shown therethrough. Preferably, the roughened surface causes a more uniform distribution of light over a larger area than occurs with no lens cover. The roughened surface may be fabricated by sandblasting or the like or may be formed by a molding operation.

In an alternative embodiment of the invention, the cap member is opaque.

Preferably, when the cap member is in a closed position, the cap member tightly contacts the upper surface of the body all the way around its perimeter (See FIG. 2). Alternatively, when closed, the cap member may be spaced from the first side and second side of the body member (See FIGS. 4 and 5). This allows a user to see if the flashlight has inadvertently been left in an on position in the event an opaque cap is used.

Preferably, the outer wall surface of the first side and the second side of the body member are provided with gripping members. This makes it easier for the user to squeeze the first side and the second side relatively closer together to release the latch.

Preferably, the body pivotal connection means and the cap pivotal connection means each further comprises a pair of spaced apart ear members and a pivot pin is provided to pivotally connect the body member to the cap member.

Preferably, the spring member is provided on said pivot pin and said spring has one end in contact with the body member and an opposite end in contact with the cap member. Preferably, the cylindrical edge of the cap portion further comprises a latch member receiving groove whereby when said latch is received by said cylindrical edge is restrained from movement in any direction.

Preferably, the top surface includes flat plate members provided at the first end and second end which are juxtaposed to the cap member when the cap member is in the closed position.

Preferably, the inner wall surface of the bottom end is attached to a flashlight head by retaining clips which shape into openings provided in the flashlight head.

Preferably, the flashlight lens cover of the present invention protects the lens of a flashlight when the cap member is in a closed position.

BRIEF DESCRIPTION OF THE DRAWINGS

FIG. 2 is a side elevational view of the lens cover of the present invention in a fully open position.

FIG. 3 is a diagram which illustrates the principle by which the latch is released.

FIG. 6 is a perspective view of a portion of the lens cap showing the latch member receiving groove.

DETAILED DESCRIPTION OF THE PREFERRED EMBODIMENTS

Figure 1:
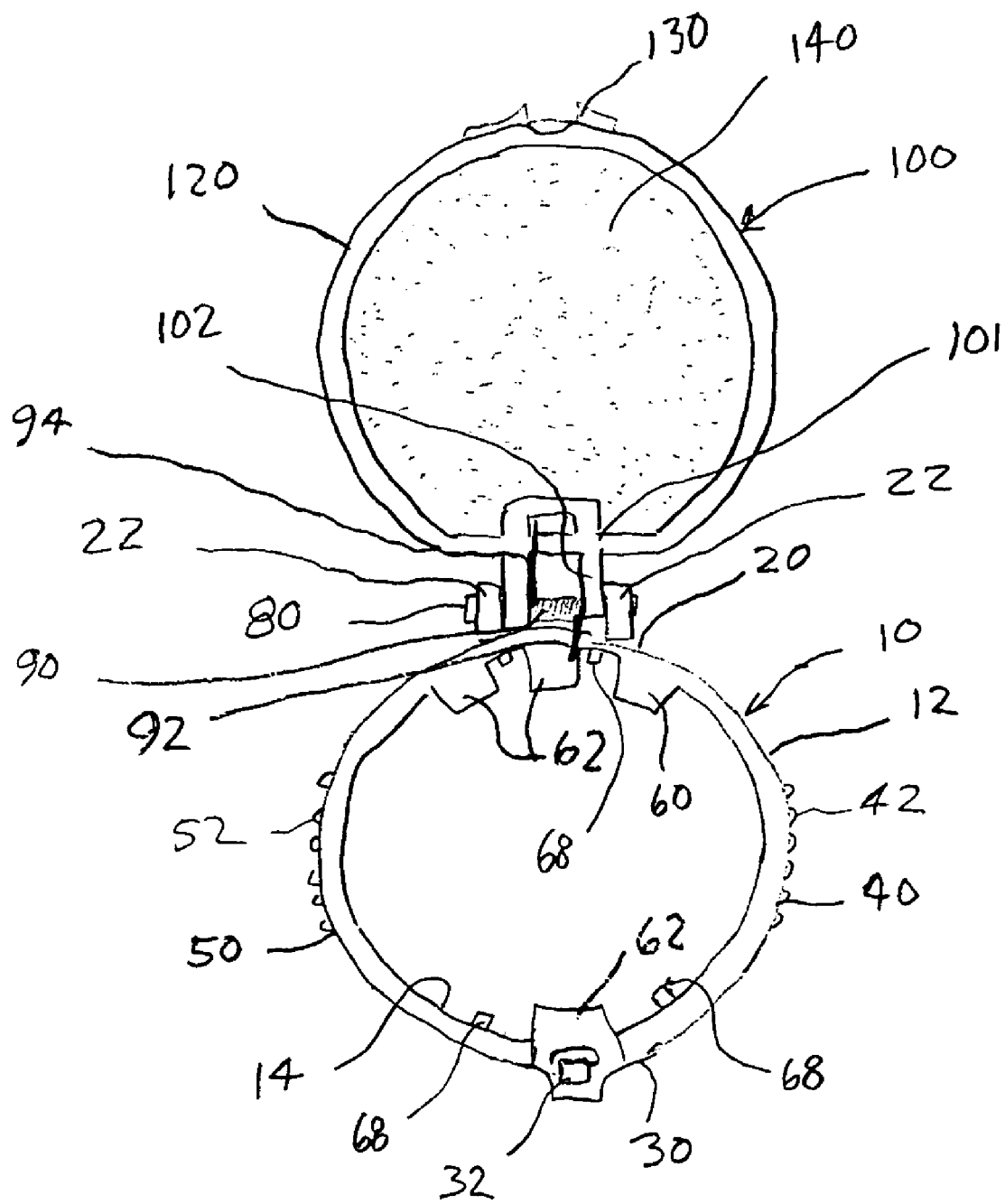
FIG. 1 is a top plan view of the lens cover of the present invention in a partially open position.

Referring to the figures, the present invention includes a generally cylindrical body member 10 which has an outer wall portion 12 and an inner wall portion 14. The body member 10 is preferably fabricated from strong but partially flexible plastic material. The body includes a first end 20 which includes a body pivotal connection means 22 in the form of pair of spaced apart ear members and a second end 30 which includes a latch member 32.

The body 10 also includes a first end 40 and a second end 50. The first end 40 is provided with gripping surface 42 and the second end 50 is provided with a gripping surface 52. The body includes a top surface 60 and a bottom surface 70. Preferably, the series of plate portions 62 are provided at the upper surface 60. Plate members 62 and the entire upper surface 60 will be juxtaposed to the lens cap 100 when said lens cap 100 is in a closed position.

The lens cap 100 includes pivotal connection means 101 which includes a pair of spaced apart ears 102 which are mounted on pivot pin 80. A spring 90 is also located on pivot pin 80 which has and spring 90 has a first end 92 in contact with body portion 10 and spring 90 has a second end 94 in contact with the lens cap 100.

The lens cap 100 includes an outer perimeter portion 120 and has a latch member receiving groove 130 as is shown in FIGS. 1 and 6. The lens cap 100 is preferably translucent and has at least one surface 140 which is roughened or course so as to diffuse light showing therethrough. Alternatively, the lens cap may have an opaque color or may be utilized for any type of filter or light beam modifier device.

When the latch member 32 is released from the latch member receiving groove 130, the spring 90 causes the cap 100 to be biased in a fully open position out of the beam of light as shown in FIG. 2. As shown in FIG. 2, the bottom end 70 of the body 10 is provided with retaining clips 68 which snap into openings 220 in a flashlight head 200 as shown in chain line. When the lens cap 100 is in a closed position, the lens cap protects the lens 210 of the flashlight 200.

Figure 4:
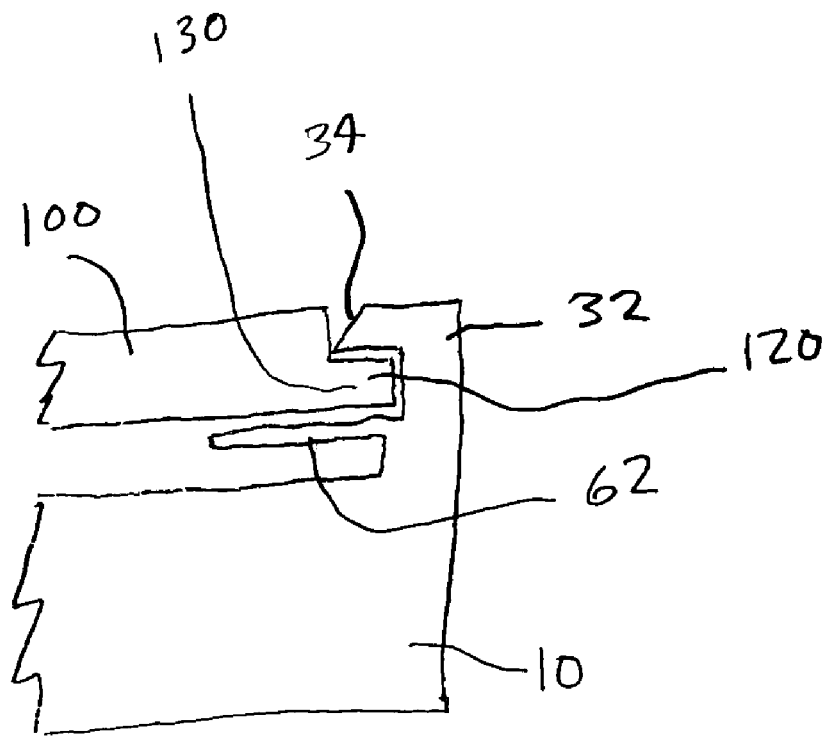
FIG. 4 is a side elevational view of a portion of the cover in a closed position as held in place by the latch.
Figure 5:
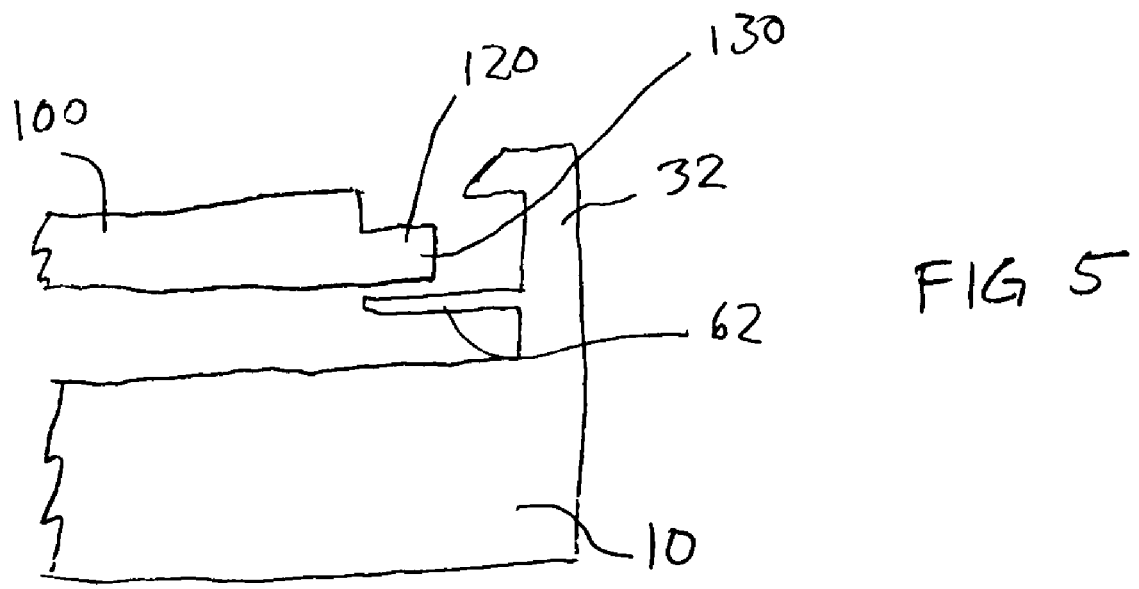
FIG. 5 is a side elevational view of a portion of the lens cover with the latch being released.

Referring to FIG. 4, the cap 100 is shown in a closed and latched position. In this position, latch 32 engages the groove 130 in the cylindrical edge portion 120 of the cap preventing it from opening. By pressing inwardly on first side 40 and second side 50 causing said first side and second side to move relatively closer together, second end 30 is caused to move to the position shown as 30' in FIG. 3. As shown in FIG. 5, this causes the latch 32 to release the lens cap 100 which will spring to the fully open position of FIG. 2.

When it is desired to return the lens cap 100 to a closed position, it is manually rotated back to a closed position and the cylindrical edge 120 contacts the incline surface 34 of the latch 32. This causes the latch member 32 to be moved temporarily-outwardly allowing the cap 100 to be retained by the latch 32 (as shown in FIG. 4).

While I have, shown and described the presently preferred embodiment of our invention, the invention is not limited thereto and may be otherwise variously practiced within the scope of the following claims:

We claim:

1. A flashlight lens cover comprising:
   a) a generally cylindrical body member having an outer wall surface, an inner wall surface, a first end, a second end, a first side, a second side, a top surface and a bottom surface, said body member having a body pivotal connection means at said first end of said outer wall and a latch member at said second end, said latch member extending upwardly above said top surface, said latch member having a retaining ledge portion which extends inwardly to a position located inside said outer wall surface, and said latch member having an inclined upper surface portion which slopes inwardly toward said inner wall and downwardly toward said top surface;
   b) a generally circular cap member having a cap pivotal connection means pivotally connected to said body pivotal connection means to allow said cap member to pivot between a closed position and an open position, said cap member adapted to rest upon said body member top surface when in said closed position, said cap member having a cylindrical edge portion which when closed pushes said inclined upper surface portion of said latch member temporarily outwardly and causing said edge portion to be held in said closed position by said retaining ledge; and
   c) a spring member positioned between said body member and said cap member to urge said cap member to said open position, whereby when inward force is imparted to said first side and said second side to move said first side and said second side of said body member relatively closer together, said first end and said second end are caused to move relatively further apart causing said retaining ledge of said latch means to be moved away from engagement with said cap edge portion and causing said cap member to move to and stay in an open position until manually closed.

2. The flashlight lens cover according to claim 1 wherein said cap member is translucent.

3. The flashlight lens cover according to claim 1 wherein said cap member has a roughened surface to at least partially diffuse light shown therethrough.

4. The flashlight lens cover according to claim 3 wherein said roughened surface causes a more uniform distribution of light over a larger area than occurs with no lens cover.

5. The flashlight lens cover according to claim 3 wherein said roughened surface is made course by sandblasting or the like.

6. The flashlight lens cover according to claim 1 wherein said cap member is opaque.

7. The flashlight lens cover according to claim 1 wherein said cap member is spaced from said first side and said second side of said body member when in a closed position.

8. The flashlight lens cover according to claim 1 wherein said outer wall surface of said first side and said second side of said body member are provided with gripping members.

9. The flashlight lens cover according to claim 1 wherein said body pivotal connection means and said cap pivotal connection means each further comprises a pair of spaced apart ear members and wherein a pivot pin is provided to pivotally connect said body member and said cap member.

10. The flashlight lens cover according to claim 9 wherein said spring member is provided on said pivot pin and said spring has one end in contact with said body member and an opposite end in contact with said cap member.

11. The flashlight lens cover according to claim 1 wherein said cylindrical edge of said cap portion further comprises a latch member receiving groove whereby when said latch is received by said groove said cylindrical edge is restrained from moving in any direction.

12. The flashlight lens cover according to claim 1 wherein said top surface includes flat plate members provided at said first end and said second end juxtaposed to said cap member when is said closed position.

13. The flashlight lens cover according to claim 1 wherein inner wall surface of said bottom end is attached to a flashlight head.

14. The flashlight lens cover according to claim 13 wherein said cap member protects a lens of said flashlight when in said closed position.

15. The flashlight lens cover comprising:
a) a generally cylindrical body member;
b) a generally circular cap member which is pivotally connected to said body member; and
c) a spring member connected between said body and said cap to urge said cap to an open position, whereby when inward force is imparted to opposite sides of the body member, said sides move relatively closer together causing a first end and a second end of said body to move relatively further apart causing a latch member on said body to be moved away from engagement with an edge portion of the cap causing the cap member to move to an open position until manually closed.

* * * * *